US008175743B2

(12) United States Patent
Nara

(10) Patent No.: US 8,175,743 B2
(45) Date of Patent: May 8, 2012

(54) MEASUREMENT SYSTEM AND INTERFEROMETER

(75) Inventor: Masayuki Nara, Tsukuba (JP)

(73) Assignee: Mitutoyo Corporation, Kawaski-shi (JP)

( * ) Notice: Subject to any disclaimer, the term of this patent is extended or adjusted under 35 U.S.C. 154(b) by 271 days.

(21) Appl. No.: 12/707,242

(22) Filed: Feb. 17, 2010

(65) Prior Publication Data

US 2010/0211206 A1 Aug. 19, 2010

(30) Foreign Application Priority Data

Feb. 17, 2009 (JP) ................................ 2009-033546

(51) Int. Cl.
*G06F 19/00* (2011.01)
*G01C 1/00* (2006.01)
*G01B 11/26* (2006.01)
*G01B 3/00* (2006.01)
*G01B 5/00* (2006.01)

(52) U.S. Cl. ........ 700/178; 700/175; 700/177; 700/193; 700/195; 702/33; 702/40; 702/94; 702/172; 356/152.3; 356/498; 356/500; 356/501

(58) Field of Classification Search ................ 700/175, 700/177–178, 193, 195; 702/33, 40, 94, 702/172; 356/152.3, 498, 500, 501
See application file for complete search history.

(56) References Cited

U.S. PATENT DOCUMENTS

| | | | | |
|---|---|---|---|---|
| 4,583,298 A | * | 4/1986 | Raugh | 33/502 |
| 4,714,339 A | * | 12/1987 | Lau et al. | 356/4.09 |
| 5,798,947 A | * | 8/1998 | Ye et al. | 702/95 |
| 6,317,991 B1 | * | 11/2001 | Rinn | 33/1 M |
| 6,330,063 B1 | * | 12/2001 | Knuettel et al. | 356/479 |
| 6,509,971 B2 | * | 1/2003 | Inoue et al. | 356/487 |
| 7,188,046 B2 | * | 3/2007 | Nara et al. | 702/155 |
| 7,225,104 B2 | * | 5/2007 | Nara et al. | 702/179 |
| 7,583,374 B2 | * | 9/2009 | Nara | 356/152.3 |
| 7,765,079 B2 | * | 7/2010 | Nara et al. | 702/94 |
| 2007/0112541 A1 | * | 5/2007 | Nara et al. | 702/155 |
| 2008/0025311 A1 | | 1/2008 | Okagawa | |
| 2008/0259311 A1 | * | 10/2008 | Nara | 356/4.01 |
| 2011/0279807 A1 | * | 11/2011 | Shibazaki | 355/72 |

FOREIGN PATENT DOCUMENTS

JP 2008-128899 6/2008

* cited by examiner

*Primary Examiner* — Ramesh Patel

(74) *Attorney, Agent, or Firm* — Rankin, Hill & Clark LLP

(57) ABSTRACT

A measurement system that includes an industrial machine and an interferometer can detect when abnormality has occurred in measurement targeted at a reflector attached to a movable body, for example, in a case where the movable body has moved too close to the interferometer. A judging section of the interferometer judges that there is abnormality in measurement targeted at the reflector on the basis of a received-light signal. Upon such an abnormality judgment, a stop command outputting section of the interferometer outputs a stop command to the industrial machine. A stopping section of the industrial machine stops the driving operation of a moving mechanism upon receiving an input of the stop command, thereby stopping the movement of the movable body. The measurement system makes it possible to prevent the industrial machine, which includes the movable body and the moving mechanism, from colliding with the interferometer.

8 Claims, 2 Drawing Sheets

MEASUREMENT SYSTEM AND INTERFEROMETER

BACKGROUND OF THE INVENTION

1. Field of the Invention

The present invention relates to a measurement system and an interferometer.

2. Description of the Related Art

As a means for measuring the motion error of an industrial machine such as a three-dimensional measuring machine, a working machine (i.e., machine tool), and the like, a measurement system that moves a movable body (i.e., movement member) through the operation of the industrial machine and measures a coordinate value of the movable body by means of an interferometer is known in the art. A measurement sensor that is used for measuring a target object or a machining head device that is used for machining the target object is mounted on the movable body. For example, a tracking-type laser interferometer is used as such an interferometer for measuring the coordinate value of the movable body. An example of the tracking-type laser interferometer is disclosed in Japanese Unexamined Patent Application Publication No. 2008-128899. The tracking-type laser interferometer controls the emission direction of a beam of laser light to keep track of a retro reflector that is attached to the movable body. In addition, the tracking-type laser interferometer utilizes laser interference to measure a distance therefrom to the retro reflector. A plurality of such tracking-type laser interferometers is provided inside the measurement space or the machining space of the industrial machine. For example, three tracking-type laser interferometers are provided inside the space. Each interferometer keeps track of the retro reflector and measures a distance therefrom to the retro reflector. The measured distance from each interferometer to the retro reflector is used for trilateration. By this means, it is possible to find a three-dimensional coordinate value of the retro reflector, that is, a three-dimensional coordinate value of the movable body.

However, when a tracking-type laser interferometer is used for measuring a three-dimensional coordinate value of a movable body, it is necessary to install the tracking-type laser interferometer inside the measurement space or the machining space of an industrial machine. For this reason, there is a risk that the movable body moves too close to the interferometer and collides with the interferometer in a case where a defective movement program designed for moving the movable body is inputted in the industrial machine. There is the same risk as above in a case where, when an operator manually operates the industrial machine to move the movable body, the operator fails to operate the industrial machine properly. The same holds true in a case where an operator fails to install the interferometer at a proper installation position.

SUMMARY OF THE INVENTION

An advantage of some aspects of the invention is to provide a measurement system that makes it possible to prevent the collision of an industrial machine and an interferometer. In addition, the interferometer as a component of the measurement system is provided.

A measurement system according to an aspect of the invention has the following features. The measurement system includes an industrial machine and an interferometer. The industrial machine includes a relative movement member, a table, a moving mechanism, and a stopping section. A measuring element that is used for measuring a target object or a machining device that is used for machining the target object is mounted on the relative movement member. Either the relative movement member or the target object moves relative to the other. The target object is placed on the table. The moving mechanism either moves the relative movement member relative to the target object or moves the table so as to move the target object relative to the relative movement member. The interferometer includes a measurement unit and an information processing unit. The measurement unit includes a reflector, a light source, and a light reception unit. The light source of the measurement unit emits light toward the reflector that is attached to the relative movement member. The light reception unit of the measurement unit receives light reflected by the reflector. The measurement unit generates a received-light signal upon receiving the light and outputs the generated signal. The information processing unit calculates a distance from a reference point inside the measurement unit to the reflector on the basis of the received-light signal. The information processing unit includes a judging section and a stop command outputting section. The relative movement member moves relative to the measurement unit in a case where the moving mechanism moves the relative movement member relative to the target object. Or, the measurement unit is mounted on the table and moves relative to the relative movement member in a case where the moving mechanism moves the table so as to move the target object relative to the relative movement member. The judging section of the information processing unit judges whether there is any abnormality in measurement targeted at the reflector on the basis of the received-light signal. The stop command outputting section of the information processing unit outputs a stop command for instructing that driving operation of the moving mechanism should be stopped when it is judged by the judging section that there is abnormality in measurement targeted at the reflector. The stopping section of the industrial machine stops the driving operation of the moving mechanism upon receiving an input of the stop command.

In the operation of a measurement system according to the above aspect of the invention, in a case where some abnormality has occurred in measurement targeted at the reflector attached to the relative movement member, for example, in a case where the relative movement member and the interferometer (measurement unit) become too close to each other either as a result of the movement of the relative movement member toward the interferometer by the moving mechanism or as a result of the movement of the table by the moving mechanism and the resultant movement of the interferometer mounted on the table toward the relative movement member, the judging section of the interferometer judges that there is abnormality in measurement targeted at the reflector on the basis of the received-light signal. Upon judging such an abnormality, the stop command outputting section of the interferometer outputs a stop command to the industrial machine. The stopping section of the industrial machine stops the driving operation of the moving mechanism upon receiving an input of the stop command, thereby stopping the movement of the relative movement member or the interferometer. Therefore, whenever there is abnormality in measurement targeted at the reflector attached to the relative movement member, for example, in a case where the relative movement member and the interferometer become too close to each other, which could be caused, for example, when an operator inputs a defective movement program designed for moving the relative movement member or the interferometer in the industrial machine, when an operator fails to operate the industrial machine properly (which means an operational error) during manual operation of the industrial machine to move the relative movement member or the interferometer, or when an operator fails to install the interferometer at a proper installation position, the stopping section of the industrial machine stops the driving operation of the moving mechanism. Thus, the measurement system makes it possible to prevent the industrial machine (the relative movement member and the moving mechanism) from colliding with the interferometer or vice versa.

In the configuration of a measurement system according to the above aspect of the invention, it is preferable that the judging section include a distance calculating section that calculates the distance from the reference point to the reflector on the basis of the received-light signal and further include a distance abnormality judging section that judges that there is an abnormality in measurement targeted at the reflector in a case where the distance calculated by the distance calculating section is not greater than a predetermined threshold value.

In the operation of a measurement system having such a preferred configuration, in a case where the distance from the reference point to the reflector calculated by the distance calculating section becomes less than or equal to the predetermined threshold value due to the relative movement of the relative movement member and the interferometer too close to each other, the distance abnormality judging section judges that there is distance abnormality in measurement targeted at the reflector. Upon judging such an abnormality, the stop command outputting section outputs a stop command to the industrial machine. The stopping section of the industrial machine stops the driving operation of the moving mechanism upon receiving an input of the stop command. Since the stopping section of the industrial machine stops the driving operation of the moving mechanism when the relative movement member has moved too close to the interferometer or vice versa, it is possible to effectively prevent the industrial machine from colliding with the interferometer or vice versa.

In the configuration of a measurement system according to the above aspect of the invention, it is preferable that the judging section include a received-light amount abnormality judging section that judges on the basis of the received-light signal that there is abnormality in measurement targeted at the reflector in a case where the amount of the light received at the light reception unit is not greater than a predetermined threshold value.

In the operation of a measurement system having such a preferred configuration, in a case where the amount of the light received at the light reception unit becomes less than or equal to the predetermined threshold value, which will occur when the interferometer loses sight of the reflector, the received-light amount abnormality judging section judges that there is received-light amount abnormality in measurement targeted at the reflector. Upon judging such an abnormality, the stop command outputting section outputs a stop command to the industrial machine. The stopping section of the industrial machine stops the driving operation of the moving mechanism upon receiving an input of the stop command. Since the stopping section of the industrial machine stops the driving operation of the moving mechanism when the interferometer has lost sight of the reflector, it is possible to reliably prevent the industrial machine from colliding with the interferometer or vice versa.

In the configuration of a measurement system according to the above aspect of the invention, it is preferable that the reflector should be a retro reflector; the retro reflector should reflect a beam of incident light as a beam of reflected light that is parallel to the beam of incident light; the reflected light and the incident light should be point-symmetric with respect to the center of the retro reflector; and the interferometer should be a tracking-type laser interferometer that keeps track of the retro reflector such that a shift amount of the light reflected at the retro reflector should fall within a predetermined range.

If a non-tracking interferometer is used for measuring the distance therefrom to the reflector attached to the relative movement member, it is necessary to install the interferometer in the movement direction of the relative movement member. Accordingly, the interferometer has to be installed in a predetermined uni-axial direction each time when the relative movement member is moved in the uni-axial direction. Therefore, measurement is troublesome. In contrast, since the tracking-type laser interferometer, which keeps track of the retro reflector attached to the relative movement member, is adopted as the interferometer of a measurement system having the preferred configuration described above, after installation of the interferometer, it is possible to measure the distance therefrom to the retro reflector without any need to change its installation place, which makes measurement easier. Preferably, a plurality of such tracking-type laser interferometers is provided inside the measurement space or the machining space of the industrial machine. Each interferometer measures a distance therefrom to the retro reflector attached to the relative movement member for trilateration. By this means, it is possible to safely find a three-dimensional coordinate value of the retro reflector, (i.e., a three-dimensional coordinate value of the relative movement member) while preventing the collision of industrial machine and any interferometer.

An interferometer according to an aspect of the invention has the following features. The interferometer is used in a measurement system that includes an industrial machine and the interferometer itself. The industrial machine includes a relative movement member, a table, and a moving mechanism. A measuring element that is used for measuring a target object or a machining device that is used for machining the target object is mounted on the relative movement member. Either the relative movement member or the target object moves relative to the other. The target object is placed on the table. The moving mechanism either moves the relative movement member relative to the target object or moves the table so as to move the target object relative to the relative movement member. The interferometer includes a measurement unit and an information processing unit. The measurement unit includes a reflector, a light source, and a light reception unit. The light source of the measurement unit emits light toward the reflector that is attached to the relative movement member. The light reception unit of the measurement unit receives light reflected by the reflector. The measurement unit generates a received-light signal upon receiving the light and outputs the generated signal. The information processing unit calculates a distance from a reference point inside the measurement unit to the reflector based upon the received-light signal. The information processing unit includes a judging section and a stop command outputting section. The relative movement member moves relative to the measurement unit in a case where the moving mechanism moves the relative movement member relative to the target object. Or, the measurement unit is mounted on the table and moves relative to the relative movement member in a case where the moving mechanism moves the table so as to move the target object relative to the relative movement member. The judging section judges whether there is any abnormality in measurement targeted at the reflector on the basis of the received-light signal. The stop command outputting section outputs a stop command for instructing that driving operation of the moving mechanism should be stopped when it is judged by the judging section that there is abnormality in measurement targeted at the reflector.

Since an interferometer according to the above aspect of the invention includes the judging section, it offers the same advantage as that offered by the above measurement system.

DESCRIPTION OF THE PREFERRED EMBODIMENTS

Figure 1:
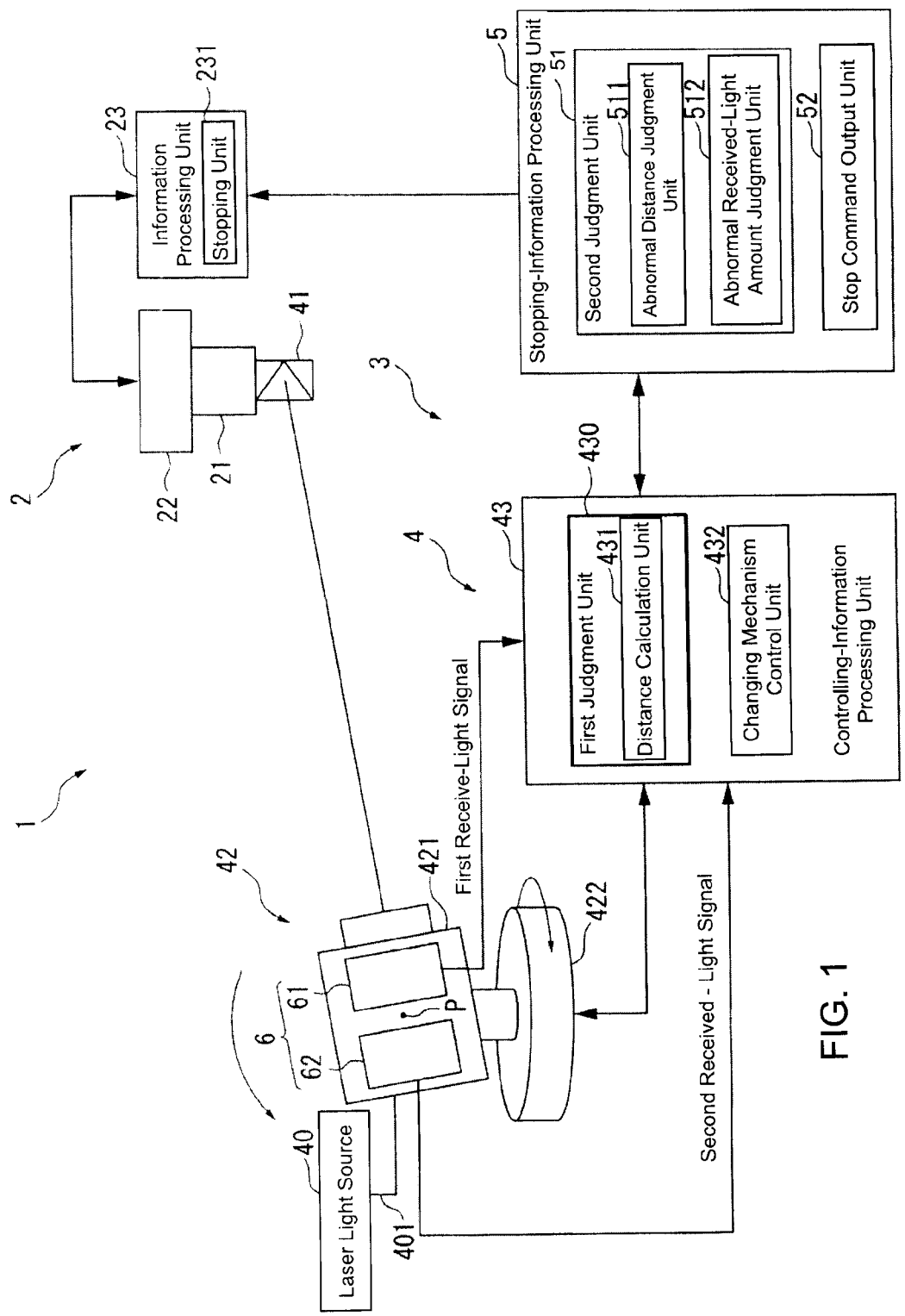
FIG. 1 is a diagram that schematically illustrates an example of the configuration of a measurement system according to an exemplary embodiment of the invention, which measures a distance to a reflector attached to a movable body by means of an interferometer.

With reference to the accompanying drawings, an exemplary embodiment of the present invention will now be explained. FIG. 1 is a diagram that schematically illustrates an example of the configuration of a measurement system 1 according to the present embodiment of the invention. As illustrated in FIG. 1, the measurement system 1 includes an industrial machine 2 and a tracking-type laser interferometer 3.

The industrial machine 2 moves a movable body 21. The tracking-type laser interferometer 3 measures a distance therefrom to the movable body 21. The tracking-type laser interferometer 3 is hereinafter simply referred to as "interferometer 3".

The industrial machine 2 moves the movable body 21 relative to a target object (not illustrated). Through the movement of the movable body 21, the industrial machine 2 measures the target object or performs machining processing on the target object. The industrial machine 2 includes the movable body 21, a placement table, a moving mechanism 22, and an information processing unit 23. A measurement sensor that is used for measuring the target object or a machining head device that is used for machining the target object is mounted on the movable body 21, which can move relative to the target object. The placement table is a table on which the target object is placed. The placement table is not illustrated. The moving mechanism 22 moves the movable body 21. The information processing unit 23 controls the driving operation of the moving mechanism 22. An example of the industrial machine 2 is a three coordinate measuring machine. An example of the movable body 21 is a slider of the three-dimensional measuring machine. A probe for measuring a target object is fixed to the slider. The information processing unit 23 includes a stopping unit 231, which stops the driving operation of the moving mechanism 22.

The interferometer 3 includes an interferometer main unit 4 and a stopping-information processing unit 5. The stopping-information processing unit 5 is connected to the interferometer main unit 4 and the industrial machine 2. Accordingly, the stopping-information processing unit 5 can communicate with the interferometer main unit 4 and the industrial machine 2. Installed inside the measurement space or the machining space of the industrial machine 2, the interferometer main unit 4 measures a distance therefrom to the movable body 21. As explained in the Description of the Related Art, a plurality of interferometers 3 is provided inside the measurement space or the machining space of the industrial machine 2. For example, three interferometers are provided inside the space. Each interferometer 3 measures a distance therefrom to the movable body 21 for trilateration. By this means, it is possible to find a three-dimensional coordinate value of the movable body 21.

The interferometer main unit 4 includes a retro reflector 41, a laser light source 40, a measurement unit 42, and a controlling-information processing unit 43. The retro reflector 41 is attached to the movable body 21. The retro reflector 41 reflects a beam of incident light with the following reflection characteristics. The propagation direction of a beam of reflected light and the propagation direction of the beam of incident light are parallel to each other. In addition, the reflected light and the incident light are centrosymmetric, that is, symmetric with respect to the center of the retro reflector 41 (i.e., point symmetry). Therefore, in a case where the incident light enters the retro reflector 41 at a certain position off the center, the path of the reflected light is shifted from the path of the incident light. The laser light source 40 is connected to the measurement unit 42 through an optical fiber 401. The laser light source 40 emits a beam of laser light to the measurement unit 42.

The measurement unit 42 is provided with a measurement optical system 421 and an emission direction changing mechanism 422. The configuration of the measurement optical system 421 is known as described in detail in, for example, Japanese Unexamined Patent Application Publication No. 2008-128899, the disclosure of which is expressly incorporated herein by reference. Therefore, the configuration of the measurement optical system 421 is briefly explained below. The measurement optical system 421 includes a half mirror, a reference plane, a light reception unit 6, and the like. The light reception unit 6 is made up of a first light reception unit 61 and a second light reception unit 62. The first light reception unit 61 is provided with a photo detector (PD). The second light reception unit 62 is provided with a quadrisected (i.e., four-divided) photodiode (PD) or a two-dimensional position sensitive detector (PSD).

The measurement optical system 421 that includes the above optical components operates as follows. The half mirror splits a beam of laser light emitted from the laser light source 40 into a beam of reference light and a beam of measurement light. The reference light is reflected at the reference plane. The measurement light propagates toward the retro reflector 41. The measurement light reaches the retro reflector 41 and is reflected thereby. The light reflected at the retro reflector 41 propagates back toward the measurement optical system 421 as a beam of backward light, which is hereinafter referred to as "return light". The return light enters the measurement optical system 421. As explained earlier, in a case where the measurement light enters the retro reflector 41 at a certain position off the center thereof, the measurement light is reflected with an optical shift orthogonal to, or in relation to, the direction of the incidence of the measurement light. Therefore, in such a case, the path of the return light is shifted from the path of the measurement light.

Some part of the return light that enters the measurement optical system 421 is received at the second light reception unit 62. The return light enters at a certain position off the center of the light reception plane of the second light reception unit (e.g., quadrisected PD) 62 depending on the amount of the shift. The light reception plane of the second light reception unit 62 is sectioned in four blocks, that is, the upper left section, the upper right section, the lower left section, and the lower right section. The second light reception unit 62 generates four received-light signals. The level of each of the four received-light signals depends on the amount of the return light that enters the corresponding one of the four sections of the light reception plane. The four received-light signals constitute a second received-light signal. The second light reception unit 62 outputs the second received-light signal to the controlling-information processing unit 43. In other words, the second light reception unit 62 outputs the second received-light signal dependent on the amount of the received light and the shift amount of the return light to the controlling-information processing unit 43.

The other part of the return light and the reference light reflected at the reference plane turn into interference light, which is received at the first light reception unit 61. Upon receiving the interference light turned from the remaining part of the return light and the reference light reflected at the reference plane, the first light reception unit 61 outputs a first received-light signal, which is dependent on the amount of the received light and a change in a distance between the interferometer 3 and the retro reflector 41, to the controlling-information processing unit 43. The first received-light signal is used at the controlling-information processing unit 43 for calculating a distance from a predetermined reference point to the retro reflector 41.

The emission direction changing mechanism 422 includes a rotation mechanism that has two rotation axes that are orthogonal to each other. The point where the two rotation axes of the rotation mechanism intersect with each other is taken as a reference point P. The controlling-information processing unit 43 calculates the distance from the reference point P to the retro reflector 41. Under the control of the controlling-information processing unit 43, the emission direction changing mechanism 422 changes the direction of the emission of measurement light.

The controlling-information processing unit 43 includes a first judgment unit 430 and a changing mechanism control unit 432. The first judgment unit 430 includes a distance calculation unit 431. The distance calculation unit 431 calculates the distance from the reference point P to the retro reflector 41 (movable body 21) by means of the first received-light signal outputted from the first light reception unit 61.

The changing mechanism control unit 432 controls the emission direction changing mechanism 422 on the basis of the second received-light signal outputted from the second light reception unit 62. The emission direction changing mechanism 422 is controlled such that the shift amount of return light should fall within a predetermined range. With such emission-direction control, measurement light is directed toward the retro reflector 41. More specifically, as explained above, the second light reception unit (e.g., quadrisected PD) 62 outputs, to the controlling-information processing unit 43 as the second received-light signal, four received-light signals the level of each of which depends on the amount of return light that enters the corresponding one of four sections of a light reception plane. The changing mechanism control unit 432 drives the emission direction changing mechanism 422 in such a way as to equalize the level of the received-light signals corresponding to the upper sections of the light reception plane with the level of the received-light signals corresponding to the lower sections of the light reception plane, thereby changing the angle of elevation of measurement light. In addition, the changing mechanism control unit 432 drives the emission direction changing mechanism 422 in such a way as to equalize the level of the received-light signals corresponding to the left sections of the light reception plane with the level of the received-light signals corresponding to the right sections of the light reception plane, thereby changing the angle of direction (i.e., azimuthal angle) of measurement light. With the above emission-direction control, measurement light is directed toward the center of the retro reflector 41.

The stopping-information processing unit 5 includes a second judgment unit 51 and a stop command output unit 52. The second judgment unit 51 includes an abnormal distance judgment unit (i.e., distance abnormality judgment unit) 511 and an abnormal received-light amount judgment unit (i.e., received-light amount abnormality judgment unit) 512. In the present embodiment of the invention, the second judgment unit 51 of the stopping-information processing unit 5 and the first judgment unit 430 of the controlling-information processing unit 43 make up a judgment unit 7. On the basis of received-light signals, the judgment unit 7 judges whether there is any abnormality in measurement targeted at the retro reflector 41.

The abnormal distance judgment unit 511 judges whether there is any abnormality in measurement targeted at the retro reflector 41 based upon the distance from the reference point P to the retro reflector 41, which is calculated by the distance calculation unit 431. Specifically, the abnormal distance judgment unit 511 judges that some abnormality has occurred in measurement targeted at the retro reflector 41 in a case where the above distance is not greater than (i.e., less than or equal to) a predetermined threshold value.

The abnormal received-light amount judgment unit 512 judges whether there is any abnormality in measurement targeted at the retro reflector 41 based upon a received-light signal outputted from each of the first light reception unit 61 and the second light reception unit 62. Specifically, the abnormal received-light amount judgment unit 512 judges that some abnormality has occurred in measurement targeted at the retro reflector 41 in a case where either one or both of the amount of light received at the first light reception unit 61 and the amount of light received at the second light reception unit 62 is/are not greater than a predetermined threshold value(s). The predetermined threshold values are set respectively for the first light reception unit 61 and the second light reception unit 62. That is, the abnormal received-light amount judgment unit 512 judges that there is abnormality in measurement targeted at the retro reflector 41 in a case where at least one of the levels (which indicates received-light amount) of the received-light signals outputted respectively from the first light reception unit 61 and the second light reception unit 62 is not greater than the predetermined level (i.e., threshold).

In a case where either one or both of the abnormal distance judgment unit 511 and the abnormal received-light amount judgment unit 512 has/have judged that there is abnormality in measurement targeted at the retro reflector 41, the stop command output unit 52 outputs a stop command to the information processing unit 23 of the industrial machine 2. The stop command is issued for instructing the industrial machine 2 to stop the driving operation of the moving mechanism 22.

Figure 2:
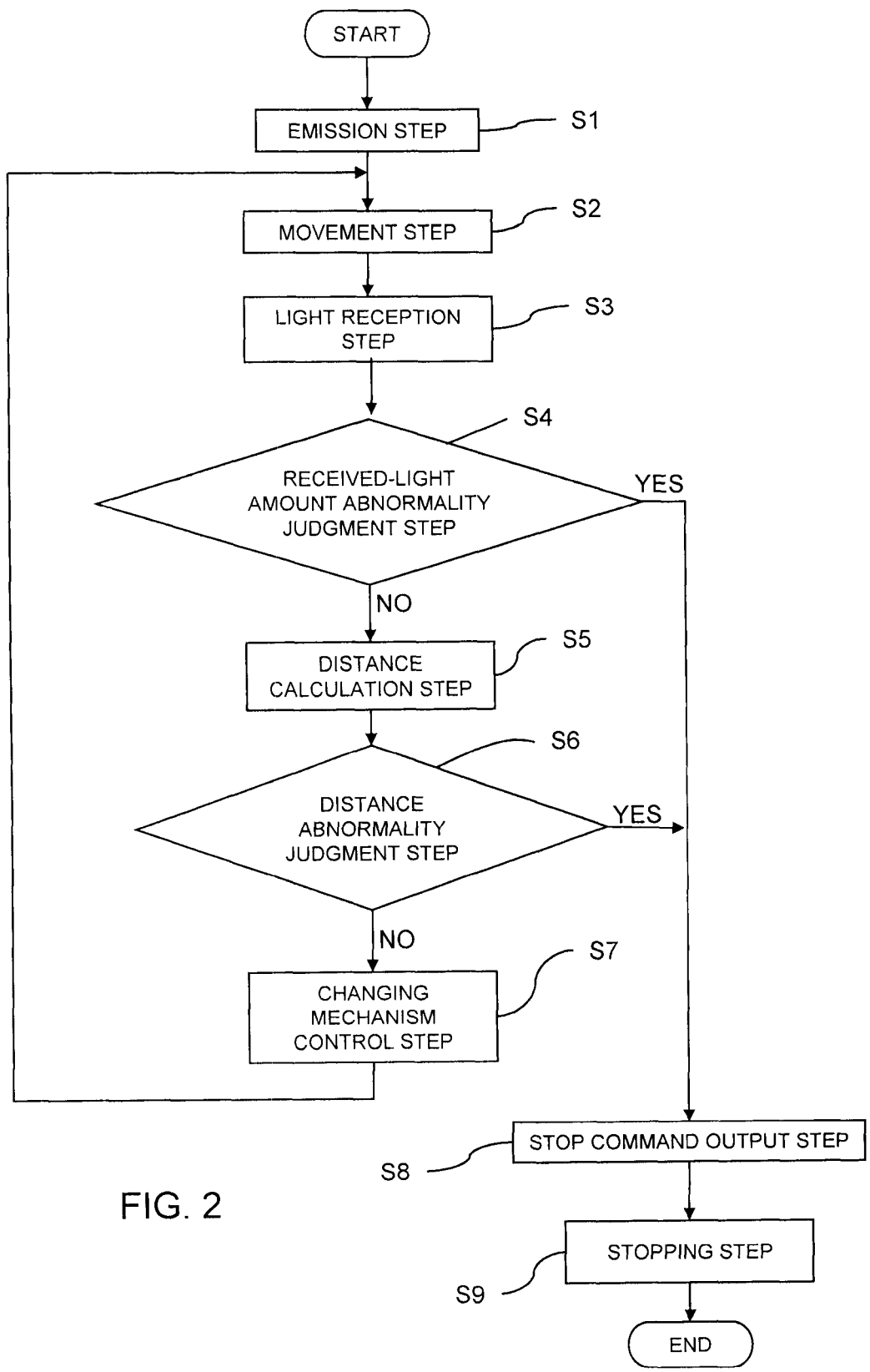
FIG. 2 is a flowchart that schematically illustrates an example of the flow of a measurement method used by the measurement system according to an exemplary embodiment of the invention.

A measurement method used by the measurement system 1, which measures a distance to the retro reflector 41 attached to the movable body 21 by means of the interferometer 3, is briefly explained below. FIG. 2 is a flowchart that schematically illustrates an example of the flow of a measurement method according to an exemplary embodiment of the invention. As a first step, the interferometer 3 emits a beam of measurement light toward the retro reflector 41 attached to the movable body 21 (hereinafter referred to as emission step S1). The emission is triggered by, for example, an operation command given by an operator.

After the emission step S1, the information processing unit 23 of the industrial machine 2 causes the moving mechanism 22 to start driving operation, thereby moving the movable body 21 (hereinafter referred to as movement step S2). For example, a movement program designed for moving the movable body 21 is inputted from the stopping-information processing unit 5 of the interferometer 3 into the information processing unit 23. The information processing unit 23 causes the moving mechanism 22 to operate in accordance with the movement program, thereby moving the movable body 21. Steps S3 to S7 explained below are executed after the movement step S2. The movement step S2 is repeated until a predetermined judgment is made in a step S4 or a step S6. Accordingly, the movable body 21 continues moving till the judgment. After the movement step S2, the first light reception unit 61 and the second light reception unit 62 of the interferometer 3 receive return light, which propagates back from the retro reflector 41 (hereinafter referred to as light reception step S3).

After the light reception step S3, the abnormal received-light amount judgment unit 512 judges whether there is any abnormality in measurement targeted at the retro reflector 41 on the basis of a received-light signal outputted from each of the first light reception unit 61 and the second light reception unit 62, that is, on the basis of the amount of light received at the first light reception unit 61 and the amount of light received at the second light reception unit 62 (hereinafter referred to as received-light amount abnormality judgment step S4). Specifically, on the basis of a received-light signal outputted from each of the first light reception unit 61 and the second light reception unit 62, the abnormal received-light amount judgment unit 512 judges that some abnormality has occurred in measurement targeted at the retro reflector 41 in a case where either one or both of the amount of light received at the first light reception unit 61 and the amount of light received at the second light reception unit 62 is/are not greater than a predetermined threshold value(s) (S4: YES). In this case, the process proceeds to a step S8, which will be explained later.

If neither of the amount of light received at the first light reception unit 61 and the amount of light received at the second light reception unit 62 is not greater than (i.e., is less than or equal to)) the corresponding predetermined threshold value (S4: NO), the abnormal received-light amount judgment unit 512 judges that there is not any abnormality in measurement targeted at the retro reflector 41. In this case, the distance calculation unit 431 calculates the distance from the reference point P to the retro reflector 41 (movable body 21) on the basis of the first received-light signal outputted from the first light reception unit 61 (hereinafter referred to as distance calculation step S5).

After the distance calculation step S5, the abnormal distance judgment unit 511 judges whether there is any abnormality in measurement targeted at the retro reflector 41 based upon the distance from the reference point P to the retro reflector 41, which has been calculated by the distance calculation unit 431 (hereinafter referred to as distance abnormality judgment step S6). Specifically, the abnormal distance judgment unit 511 judges that some abnormality has occurred in measurement targeted at the retro reflector 41 in a case where the distance from the reference point P to the retro reflector 41 calculated by the distance calculation unit 431 is not greater than a predetermined threshold value (S6: YES). In this case, the process proceeds to the step S8 explained later.

The abnormal distance judgment unit 511 judges that no abnormality has occurred in measurement targeted at the retro reflector 41 in a case where the distance from the reference point P to the retro reflector 41 calculated by the distance calculation unit 431 is greater than a predetermined threshold value (S6: NO). In this case, the changing mechanism control unit 432 controls the emission direction changing mechanism 422 based upon the second received-light signal outputted from the second light reception unit 62. The emission direction changing mechanism 422 is in such that the shift amount of return light should fall within a predetermined range. With such emission-direction control, measurement light is directed toward the retro reflector 41. The above processing is hereinafter referred to as changing mechanism control step S7. After the changing mechanism control step S7, the process returns to the movement step S2. Then, the steps S2 to S7 explained above are repeated. As a result, the retro reflector 41 continues moving together with the movable body 21. In addition, the retro reflector 41 is kept tracked. Moreover, the measurement of the distance from the reference point P to the retro reflector 41 is continued.

In a case where the abnormal received-light amount judgment unit 512 judges in the received-light amount abnormality judgment step S4 that there is abnormality in measurement targeted at the retro reflector 41 (S4: YES), the stop command output unit 52 outputs a stop command to the industrial machine 2 (hereinafter referred to as stop command output step S8). In a case where the abnormal distance judgment unit 511 judges in the distance abnormality judgment step S6 that there is abnormality in measurement targeted at the retro reflector 41 (S6: YES), the stop command output unit 52 outputs a stop command to the industrial machine 2 in the stop command output step S8. After the stop command output step S8, the stopping unit 231 of the industrial machine 2 that has received the stop-command input stops the driving operation of the moving mechanism 22, thereby stopping the movement of the movable body 21 (stopping step S9).

The present embodiment of the invention explained above produces the following advantageous effects.

(1) In the measurement system 1, in a case where some abnormality has occurred in measurement targeted at the retro reflector 41, for example, in a case where the movable body 21 has moved too close to the interferometer 3, the judgment unit 7 of the interferometer 3 judges that there is abnormality in measurement targeted at the retro reflector 41 on the basis of a received-light signal outputted from each of the first light reception unit 61 and the second light reception unit 62. Upon judging such an abnormality, the stop command output unit 52 of the interferometer 3 outputs a stop command to the industrial machine 2. The stopping unit 231 of the industrial machine 2 that has received the stop-command input stops the driving operation of the moving mechanism 22, thereby stopping the movement of the movable body 21. Since the stopping unit 231 of the industrial machine 2 stops the driving operation of the moving mechanism 22 whenever there is abnormality in measurement targeted at the retro reflector 41, the measurement system 1 makes it possible to prevent the industrial machine 2 (the movable body 21 and the moving mechanism 22) from colliding with the interferometer 3.

(2) In a case where the distance from the reference point P to the retro reflector 41 calculated by the distance calculation unit 431 becomes not greater than a predetermined threshold value due to the movement of the movable body 21 too close to the interferometer 3, the abnormal distance judgment unit 511 judges that there is distance abnormality in measurement targeted at the retro reflector 41. Upon judging such an abnormality, the stop command output unit 52 outputs a stop command to the industrial machine 2. Then, the stopping unit 231 of the industrial machine 2 stops the driving operation of the moving mechanism 22, thereby stopping the movement of the movable body 21. Since the stopping unit 231 of the industrial machine 2 stops the driving operation of the moving mechanism 22 when the movable body 21 has moved too close to the interferometer 3, it is possible to effectively prevent the industrial machine 2 from colliding with the interferometer 3.

(3) In a case where either one or both of the amount of light received at the first light reception unit 61 and the amount of light received at the second light reception unit 62 become(s) not greater than a predetermined threshold value(s), which will occur when the interferometer 3 loses sight of the movable body 21, the abnormal received-light amount judgment unit 512 judges that there is received-light amount abnormality in measurement targeted at the retro reflector 41. Upon such an abnormality judgment, the stop command output unit 52 outputs a stop command to the industrial machine 2. Then, the stopping unit 231 of the industrial machine 2 stops the driving operation of the moving mechanism 22, thereby stopping the movement of the movable body 21. Since the stopping unit 231 of the industrial machine 2 stops the driving operation of the moving mechanism 22 when the interferometer 3 has lost sight of the movable body 21, it is possible to reliably prevent the industrial machine 2 from colliding with the interferometer 3.

(4) The tracking-type laser interferometer 3, which keeps track of the retro reflector 41, is adopted as an interferometer of the present embodiment of the invention. Therefore, after the installation of the interferometer 3 once, it is possible to measure the distance therefrom to the retro reflector 41 without any need to change its installation place, which makes measurement easier. Preferably, a plurality of such tracking-type laser interferometers 3 is provided inside the measurement space or the machining space of the industrial machine 2. Each interferometer 3 measures a distance therefrom to the retro reflector 41 for trilateration. By this means, it is possible to safely find a three-dimensional coordinate value of the retro reflector 41, that is, a three-dimensional coordinate value of the movable body 21, while preventing the collision of industrial machine 2 with any interferometer 3.

(5) In the interferometer 3, in a case where some abnormality has occurred in measurement targeted at the retro reflector 41, for example, in a case where the movable body 21 has moved too close to the interferometer 3, the judgment unit 7 judges that there is abnormality in measurement targeted at the retro reflector 41 on the basis of a received-light signal outputted from each of the first light reception unit 61 and the second light reception unit 62. Upon such an abnormality judgment, the stop command output unit 52 outputs a stop command to the industrial machine 2. The industrial machine 2 that has received the stop-command input stops the driving operation of the moving mechanism 22, thereby stopping the movement of the movable body 21. By this means, it is possible to prevent the industrial machine 2 from colliding with the interferometer 3.

Variation Examples of Foregoing Embodiment

The scope of the invention is not limited to the foregoing embodiment. Various modifications, improvements, and the like that are made within a range in which an object of the invention is achieved are encompassed therein. In the configuration of the measurement system 1 according to the foregoing embodiment of the invention, it is explained that the industrial machine 2 moves the movable body 21 relative to a target object through the driving operation of the moving mechanism 22, which moves the movable body 21. However, the scope of the invention is not limited to such an exemplary configuration. For example, the moving mechanism 22 of the industrial machine 2 may move a placement table on which a target object is placed. In this modified configuration, it is the target object that is moved relative to the body (movable body) 21. In addition, the measurement unit 42 of the interferometer 3 is mounted on the placement table. As the placement table moves when driven by the moving mechanism 22, the measurement unit 42 moves relative to the movable body 21.

As done in the foregoing measurement system 1, in such a modified measurement system, in a case where some abnormality has occurred in measurement targeted at the retro reflector 41, that is, in a case where the interferometer 3 (the measurement unit 42) has moved too close to the movable body 21 or in a case where the interferometer 3 has lost sight of the retro reflector 41 attached to the movable body 21, the judgment unit 7 judges that there is abnormality in measurement targeted at the retro reflector 41 on the basis of a received-light signal outputted from each of the first light reception unit 61 and the second light reception unit 62. Upon judging such an abnormality, the stop command output unit 52 outputs a stop command to the industrial machine 2. The stopping unit 231 of the industrial machine 2 stops the driving operation of the moving mechanism 22 whenever there is abnormality in measurement targeted at the retro reflector 41. Therefore, it is possible to prevent the interferometer 3 from colliding with the industrial machine 2 (the movable body 21 and the moving mechanism 22).

The tracking-type laser interferometer 3 is adopted as an interferometer of the foregoing embodiment of the invention. If, for example, the movable body 21 is moved linearly only, a non-tracking interferometer may be provided to measure a distance therefrom to a reflector attached to the movable body 21. In the foregoing embodiment of the invention, it is explained that the judgment unit 7 judges that some abnormality has occurred in measurement targeted at the retro reflector 41 in a case where either one or both of the amount of light received at the first light reception unit 61 and the amount of light received at the second light reception unit 62 is/are not greater than a predetermined threshold value(s), and in a case where the distance from the reference point P to the retro reflector 41 calculated by the distance calculation unit 431 is not greater than a predetermined threshold value when the result of the light-received amount abnormality judgment indicates normality. Simply said, both of the distance threshold and the light-received amount threshold are used for the abnormality judgment. However, the scope of the invention is not limited to such an example. For example, the judgment unit 7 may perform a threshold-judgment processing in comparison with the distance threshold only or the light-received amount threshold only. The judgment unit 7 judges that there is abnormality in measurement targeted at the retro reflector 41 when the measurement value is not greater than the threshold value, which is related to either distance or received-light amount.

In the foregoing embodiment of the invention, it is explained that the abnormal received-light amount judgment unit 512 judges that there is abnormality in measurement targeted at the retro reflector 41 in a case where either one or both of the amount of light received at the first light reception unit 61 and the amount of light received at the second light reception unit 62 is/are not greater than a predetermined threshold value(s). However, the scope of the invention is not limited thereto. The abnormal received-light amount judgment unit 512 may judge that there is abnormality in measurement targeted at the retro reflector 41 only in a case where both of the amount of light received at the first light reception unit 61 and the amount of light received at the second light reception unit 62 are not greater than predetermined threshold values.

In the foregoing embodiment of the invention, it is explained that the stopping-information processing unit 5 that includes the second judgment unit 51 and the stop command output unit 52 is provided as a discrete unit that is separated from the interferometer main unit 4. However, it is not necessary for the stopping-information processing unit 5 to be provided as a unit separate from the interferometer main unit 4. For example, the controlling-information processing unit 43 of the interferometer main unit 4 may include the second judgment unit 51 and the stop command output unit 52 of the stopping-information processing unit 5.

The invention can be applied to a measurement system that includes an industrial machine and an interferometer, moves a movable body through the operation of the industrial machine, and measures a distance to a reflector attached to the movable body by means of the interferometer. In addition, the invention can be applied to the interferometer, which is a component of the measurement system.

What is claimed is:

1. A measurement system comprising:
   an industrial machine, comprising:
     a relative movement member on which a measuring element that is used for measuring a target object or a machining device that is used for machining the target object is mounted, either the relative movement member or the target object moving relative to the other,
     a table adapted to receive the target object,
     a moving mechanism that either moves the relative movement member relative to the target object or moves the table so as to move the target object relative to the relative movement member, and
     a stopping section; and
   an interferometer, comprising:
     a measurement unit that includes a reflector, a light source, and a light reception unit, the light source emitting light toward the reflector, which is attached to the relative movement member, the light reception unit receiving light reflected by the reflector, the measurement unit generating a received-light signal upon receiving the light and outputting the received-light signal, and
     an information processing unit that calculates a distance from a reference point inside the measurement unit to the reflector based upon the received-light signal, the information processing unit comprising:
       a judging section, and
       a stop command outputting section,
   wherein the relative movement member moves relative to the measurement unit in a case where the moving mechanism moves the relative movement member relative to the target object, whereas the measurement unit is mounted on the table and moves relative to the relative movement member in a case where the moving mechanism moves the table so as to move the target object relative to the relative movement member,
   wherein the judging section of the information processing unit judges whether there is any abnormality in measurement targeted at the reflector based upon the received-light signal,
   wherein the stop command outputting section of the information processing unit outputs a stop command for instructing that driving operation of the moving mechanism should be stopped when it is judged by the judging section that there is abnormality in measurement targeted at the reflector, and
   wherein the stopping section of the industrial machine stops the driving operation of the moving mechanism upon receiving an input of the stop command.

2. The measurement system according to claim 1, wherein the judging section includes a distance calculating section that calculates the distance from the reference point to the reflector on the basis of the received-light signal and further includes a distance abnormality judging section that judges that there is abnormality in measurement targeted at the reflector in a case where the distance calculated by the distance calculating section is not greater than a predetermined threshold value.

3. The measurement system according to claim 2, wherein the reflector is a retro reflector; the retro reflector reflects a beam of incident light as a beam of reflected light that is parallel to the beam of incident light; the reflected light and the incident light are point-symmetric with respect to a center of the retro reflector; and the interferometer is a tracking-type laser interferometer that keeps track of the retro reflector such that a shift amount of the light reflected at the retro reflector should fall within a predetermined range.

4. The measurement system according to claim 2, wherein the judging section includes a received-light amount abnormality judging section that judges based upon the received-light signal that there is abnormality in measurement targeted at the reflector in a case where the amount of the light received at the light reception unit is not greater than a predetermined threshold value.

5. The measurement system according to claim 1, wherein the judging section includes a received-light amount abnormality judging section that judges on the basis of the received-light signal that there is abnormality in measurement targeted at the reflector in a case where amount of the light received at the light reception unit is not greater than a predetermined threshold value.

6. The measurement system according to claim 5, wherein the reflector is a retro reflector; the retro reflector reflects a beam of incident light as a beam of reflected light that is parallel to the beam of incident light; the reflected light and the incident light are point-symmetric with respect to a center of the retro reflector; and the interferometer is a tracking-type laser interferometer that keeps track of the retro reflector such that a shift amount of the light reflected at the retro reflector should fall within a predetermined range.

7. The measurement system according to claim 1, wherein the reflector is a retro reflector; the retro reflector reflects a beam of incident light as a beam of reflected light that is parallel to the beam of incident light; the reflected light and the incident light are point-symmetric with respect to a center of the retro reflector; and the interferometer is a tracking-type laser interferometer that keeps track of the retro reflector such that a shift amount of the light reflected at the retro reflector should fall within a predetermined range.

8. An interferometer that is adapted for use in a measurement system that includes an industrial machine and the interferometer, the industrial machine including a relative movement member on which a measuring element that is used for measuring a target object or a machining device that is used for machining the target object is mounted, either the relative movement member or the target object moving relative to the other, a table on which the target object is placed, and a moving mechanism that either moves the relative movement member relative to the target object or moves the table so as to move the target object relative to the relative movement member, the interferometer comprising:
   a measurement unit that includes a reflector, a light source, and a light reception unit, the light source of the measurement unit emitting light toward the reflector that is attached to the relative movement member, the light reception unit of the measurement unit receiving light reflected by the reflector, the measurement unit generating a received-light signal upon receiving the light and outputting the generated signal; and an information processing unit that calculates a distance from a reference point inside the measurement unit to the reflector based upon the received-light signal, the information processing unit comprising:
  a judging section, and
  a stop command outputting section,
wherein the relative movement member moves relative to the measurement unit in a case where the moving mechanism moves the relative movement member relative to the target object, whereas the measurement unit is mounted on the table and moves relative to the relative movement member in a case where the moving mechanism moves the table so as to move the target object relative to the relative movement member, wherein the judging section judges whether there is any abnormality in measurement targeted at the reflector based upon the received-light signal, and wherein the stop command outputting section outputs a stop command for instructing that driving operation of the moving mechanism should be stopped when it is judged by the judging section that there is abnormality in measurement targeted at the reflector.

* * * * *